US010404616B2

United States Patent
Miyazawa et al.

(10) Patent No.: US 10,404,616 B2
(45) Date of Patent: Sep. 3, 2019

(54) VIRTUAL RESOURCE AUTOMATIC SELECTION SYSTEM AND METHOD

(71) Applicant: NATIONAL INSTITUTE OF INFORMATION AND COMMUNICATIONS TECHNOLOGY, Koganei-shi, Tokyo (JP)

(72) Inventors: Takaya Miyazawa, Tokyo (JP); Hiroaki Harai, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 302 days.

(21) Appl. No.: 15/589,699

(22) Filed: May 8, 2017

(65) Prior Publication Data

US 2017/0331762 A1 Nov. 16, 2017

(30) Foreign Application Priority Data

May 10, 2016 (JP) ................................ 2016-094780

(51) Int. Cl.
*H04L 12/911* (2013.01)
*G06N 20/00* (2019.01)
(Continued)

(52) U.S. Cl.
CPC .......... *H04L 47/788* (2013.01); *G06N 20/00* (2019.01); *H04L 41/5009* (2013.01); *H04L 47/805* (2013.01)

(58) Field of Classification Search
CPC . H04L 41/5009; H04L 47/788; H04L 47/805; G06N 20/00; G06F 16/285
See application file for complete search history.

(56) References Cited

U.S. PATENT DOCUMENTS

| | | | | |
|---|---|---|---|---|
| 2012/0323853 | A1* | 12/2012 | Fries | G06F 11/301 |
| | | | | 707/649 |
| 2017/0340262 | A1* | 11/2017 | Momose | A61B 10/00 |
| 2018/0061099 | A1* | 3/2018 | Evans | G06F 16/24578 |

OTHER PUBLICATIONS

F. Esposito, et al, "A Decomposition-Based Architecture for Distributed Virtual Network Embedding," ACM SIGCOMM Workshop on Distributed Cloud Computing (DCC'14), Aug. 2014, pp. 53-58.
(Continued)

*Primary Examiner* — June Y Sison
(74) *Attorney, Agent, or Firm* — Holtz, Holtz & Volek PC (57) ABSTRACT

A virtual resource automatic selection system includes a setting unit that sets, for a plurality of pieces of training data composed of two or more parameters, a classification boundary between virtual resource clusters that are ranked in accordance with a capacity of a virtual resource in terms of a relationship between the two or more parameters. When a construction request for a new virtual network is received, a receiving unit receives information composed of the parameters. A determining unit determines to which of the virtual resource clusters the parameters belong. An allocating unit allocates a capacity of a virtual resource to the virtual network. An acquiring unit acquires network performance information from the virtual network. A second determining unit determines whether the network performance information satisfies a desired quality of service. The setting unit updates the classification boundary in accordance with a determination result of the second determining unit.

6 Claims, 7 Drawing Sheets

(51) Int. Cl.
*H04L 12/24* (2006.01)
*H04L 12/927* (2013.01)

(56) References Cited

OTHER PUBLICATIONS

P. Skoldstrom, et al, "Network Virtualization and Resource Allocation in OpenFlow-based Wide Area Networks," IEEE ICC2012, Jun. 2012, pp. 6622-6626.

X. Liu, et al, "An Experimental Study on Dynamic Network Reconfiguration in a Virtualized Network Environment Using Autonomic Management," IFIP/IEEE IM2013, May 2013, pp. 616-622.

* cited by examiner

VIRTUAL RESOURCE AUTOMATIC SELECTION SYSTEM AND METHOD

FIELD OF THE INVENTION

The present invention relates to a virtual resource automatic selection system and a virtual resource automatic selection method that are suitable for automatically selecting a virtual resource to be allocated when a virtual network is constructed.

BACKGROUND

In recent years, techniques for virtualizing networks and their functions are intensively researched. In such a network virtualization technique, a physical infrastructure provider (InP) allocates a different physical resource to each virtual network in accordance with a resource request from a virtual network service provider (VNSP). This makes it possible to completely isolate each virtual network, and each VNSP can individually provide services and manage resources by using the resources on the virtual networks constructed on a common physical infrastructure.

It is speculated that the rapid spread of the Internet of Things (IoT) leads to increased diversification of data generating devices including, for example, personal computers (PCs), smartphones, vehicles, sensors, and robots and of the requirements for the quality of service (QoS). In particular, the increasing number of mobile terminals makes it necessary for VNSPs to have mechanisms that automatically recognize unexpectedly changing network use environments (e.g., traffic load, occurrence of failure or emergency incident) or diversifying service requirements with an edge computing platform or the like and that automatically and promptly select and secure resources suitable in a given situation for each virtual network.

However, the current network construction involves many manual operations in resource allocation, identification number allocation, configuration, management, and so on. These processes need to be automated in order to reduce network configuration time, human errors, and so on.

Thus, methods of allocating resources to virtual networks are proposed to date. In particular, P. Skoldstrom and K. Yedavalli, "Network Virtualization and Resource Allocation in OpenFlow-based Wide Area Networks," IEEE ICC 2012, Ottawa, Canada, pp. 6622-6626, June 2012 proposes a method that is based on a framework for OpenFlow (FlowSpace). Also, F. Esposito and I. Matta, "A Decomposition-Based Architecture for Distributed Virtual Network Embedding," ACM SIGCOMM Workshop on Distributed Cloud Computing (DCC'14), Chicago, Ill., USA, pp. 53-58, August 2014 proposes a method that is based on mathematical programming, and X. Liu, P. Juluri and D. Medhi, "An Experimental Study on Dynamic Network Reconfiguration in a Virtualized Network Environment Using Autonomic Management," IFIP/IEEE IM 2013, Ghent, Belgium, pp. 616-622, May 2013 proposes a resource allocation method that is based on the geographical locations of routers. However, with the resource allocation methods disclosed in Skoldstrom et. al., Esposito et. al., and Liu et. al., the virtual resource selection policy with respect to the virtual network construction request is fixed. In other words, the standard for determining how much and what type of virtual resources are to be allocated with respect to a given service requirement is fixed. Thus, the policy may not always be optimal in terms of assuring the quality of service and efficiently using the resources when an unexpected change in the network use environment occurs. If, in order to assure the quality of service, the virtual resource selection policy is to be determined and modified through manual and complex calculation processes each time the network use environment changes, the processing time increases, and the labor burden increases. These things make the implementation difficult.

When traffic congestion caused by an accident in logistics, security increase in a specific area, a natural disaster, a building collapse, an entertainment event, or the like occurs suddenly, there may arise a problem in that the quality of service is not assured due to a shortage of resources in an amount necessary for handling such an incident. In addition, with regard to a virtual network construction request requiring a high level of quality of service, the quality of service needs to be assured by automatically and quickly selecting and securing a virtual resource suitable for a given situation. In other words, a VNSP needs to be able to perform proactive control so that a virtual resource suitable for the service requirement or the use environment of the virtual network can be selected even when an emergency incident or a sudden traffic change occurs.

In addition to the above described problems, the techniques disclosed in Skoldstrom et. al., Esposito et. al., and Liu et. al. center on the technique pertaining to resource allocation of nodes and links in a network, and Skoldstrom et. al., Esposito et. al., and Liu et. al. are silent as to the selection and allocation of resources including computer resources, such as servers that conduct data processing, in a large-scale network constituted by an edge network, a core network, and a data center.

SUMMARY OF THE INVENTION

The present invention has been made in view of the above-described problems and intends to provide a virtual resource automatic selection system and a virtual resource automatic selection method that, when a network resource and a computer resource (hereinafter, the two are collectively referred to as a virtual resource) for a virtual network are selected on the basis of a required level of quality of application service, a traffic load, a failure status, and so on, enable efficient selection by applying a classification technique of supervised learning, which is one type of machine learning. This makes it possible to promptly select and allocate a resource including a computer resource, such as a server that conducts data processing, and to select a virtual resource suitable for a service requirement or the use environment of the virtual network even when an emergency incident or a sudden traffic change occurs.

The inventors have conducted diligent studies in order to assure the quality of service by automatically selecting a resource suitable for a virtual network requiring a high level of quality of service even when the network use environment changes in association with an occurrence of an unexpected emergency incident, a change in traffic, or the like and when a virtual network is constructed in a large-scale network extending across an edge network, a core network, and a data center, as described above. As a result, the inventors have conceived of a virtual resource automatic selection system that uses supervised learning, which is a type of machine learning, in setting a policy for automatically selecting virtual resources for respective virtual networks. In other words, when a new virtual network is constructed, a virtual resource is selected in accordance with a virtual resource selection policy automatically determined in advance by learning. In addition, relearning is autonomously executed in response to an occurrence of an unexpected emergency incident or in accordance with a result of monitoring the quality performance of the virtual network. This makes it possible to automatically and adaptively modify the virtual resource selection policy, and a resource that can assure the quality of service can be preferentially provided in response to a new virtual network construction request requiring a high level of quality of service. Along with this, a shortage of resources can be alleviated proactively, and a resource suitable for a given situation can be secured.

According to a first aspect of the present invention, there is provided a virtual resource automatic selection system that automatically selects a virtual resource to be allocated when a virtual network is constructed. The virtual resource automatic selection system includes a classification boundary setting unit that sets, for a plurality of pieces of training data composed of two or more parameters, a classification boundary between a plurality of virtual resource clusters that are ranked in advance in accordance with a capacity of a virtual resource in terms of a relationship between the two or more parameters; an input information receiving unit that, when a construction request for a new virtual network is received, receives input information composed of the two or more parameters required for the virtual network to be constructed; a cluster determining unit that determines to which of the virtual resource clusters the two or more parameters composing the input information received by the input information receiving unit belong by referring to the classification boundary set by the classification boundary setting unit; an allocating unit that allocates a capacity of a virtual resource corresponding to the virtual resource cluster determined by the cluster determining unit to the virtual network for which the construction request has been received; a performance information acquiring unit that acquires network performance information from the virtual network constructed on the basis of the virtual resource allocated by the allocating unit; and a service quality determining unit that determines whether the network performance information acquired by the performance information acquiring unit satisfies a desired quality of service. The classification boundary setting unit updates the classification boundary in accordance with a determination result of the service quality determining unit.

A virtual resource automatic selection system according to a second aspect of the present invention is similar to the first aspect, and the classification boundary setting unit of the second aspect acquires in advance two-dimensional coordinates onto which a plurality of pieces of training data composed of two parameters are plotted with the two parameters representing respective coordinate axes, and sets the classification boundary onto the two-dimensional coordinates on the basis of a capacity of a virtual resource to which each piece of the training data is assigned.

A virtual resource automatic selection system according to a third aspect of the present invention is similar to the first or second aspect, and further includes an event occurrence detecting unit that detects an occurrence of an event. Also, the classification boundary setting unit of the third aspect sets in advance a classification boundary of a virtual resource cluster for event occurrence corresponding to a level of quality of an application required in a case in which the event occurs, and the cluster determining unit of the third aspect makes a determination upon shifting to the classification boundary of the virtual resource cluster for event occurrence in a case in which the event occurrence detecting unit detects an occurrence of the event.

A virtual resource automatic selection system according to a fourth aspect of the present invention is similar to any one of the first to third aspects, and the classification boundary setting unit of the fourth aspect generates new training data on the basis of the two or more parameters composing the input information received by the input information receiving unit and the capacity of the virtual resource allocated by the allocating unit, and updates the classification boundary on the basis of the newly generated training data and the determination result of the service quality determining unit.

A virtual resource automatic selection system according to a fifth aspect of the present invention is similar to one of the first to fourth aspects. When the service quality determining unit determines that the acquired network performance information does not satisfy the desired quality of service, the allocating unit of the fifth aspect allocates a capacity of a virtual resource corresponding to the virtual resource cluster determined by the cluster determining unit to the virtual network for which the construction request has been received, upon the classification boundary setting unit having updated the classification boundary.

According to a sixth aspect of the present invention, there is provided a virtual resource automatic selection method of automatically selecting a virtual resource to be allocated when a virtual network is constructed. The virtual resource automatic selection method includes a classification boundary setting step of setting, for a plurality of pieces of training data composed of two or more parameters, a classification boundary between a plurality of virtual resource clusters that are ranked in advance in accordance with a capacity of a virtual resource in terms of a relationship between the two or more parameters; an input information receiving step of, when a construction request for a new virtual network is received, receiving an input information composed of the two or more parameters required for the virtual network to be constructed; a cluster determining step of determining to which of the virtual resource clusters the two or more parameters composing the input information received in the input information receiving step belong by referring to the classification boundary set in the classification boundary setting step; an allocating step of allocating a capacity of a virtual resource corresponding to the virtual resource cluster determined in the cluster determining step to the virtual network for which the construction request has been received; a performance information acquiring step of acquiring network performance information from the virtual network constructed on the basis of the virtual resource allocated in the allocating step; and a service quality determining step of determining whether the network performance information acquired in the performance information acquiring step satisfies a desired quality of service. The classification boundary is updated in the classification boundary setting step in accordance with a determination result in the service quality determining step.

According to the present invention with the above-described configurations, when a new virtual network is constructed, a virtual resource can be selected immediately in accordance with a virtual resource selection policy automatically determined by learning. In addition, when the network use environment changes in association with an occurrence of an unexpected emergency incident, a change in traffic, or the like, this can be recognized through data analysis or by monitoring the quality performance of the virtual network, and relearning can be executed autonomously in accordance with the result. Thus, the present invention can automatically and adaptively update the virtual resource selection policy.

According to the present invention, even when an unexpected change in the network use environment occurs or the required quality of service becomes diversified, this can be recognized automatically, and the virtual resource selection policy can be modified autonomously on the basis of the machine learning model. As a result, a resource that assures the level of quality of service can be secured promptly, adaptively, and automatically.

DETAILED DESCRIPTION OF THE INVENTION

Hereinafter, an embodiment for implementing a virtual resource automatic selection system to which the present invention is applied will be described in detail with reference to the drawings.

Figure 1:
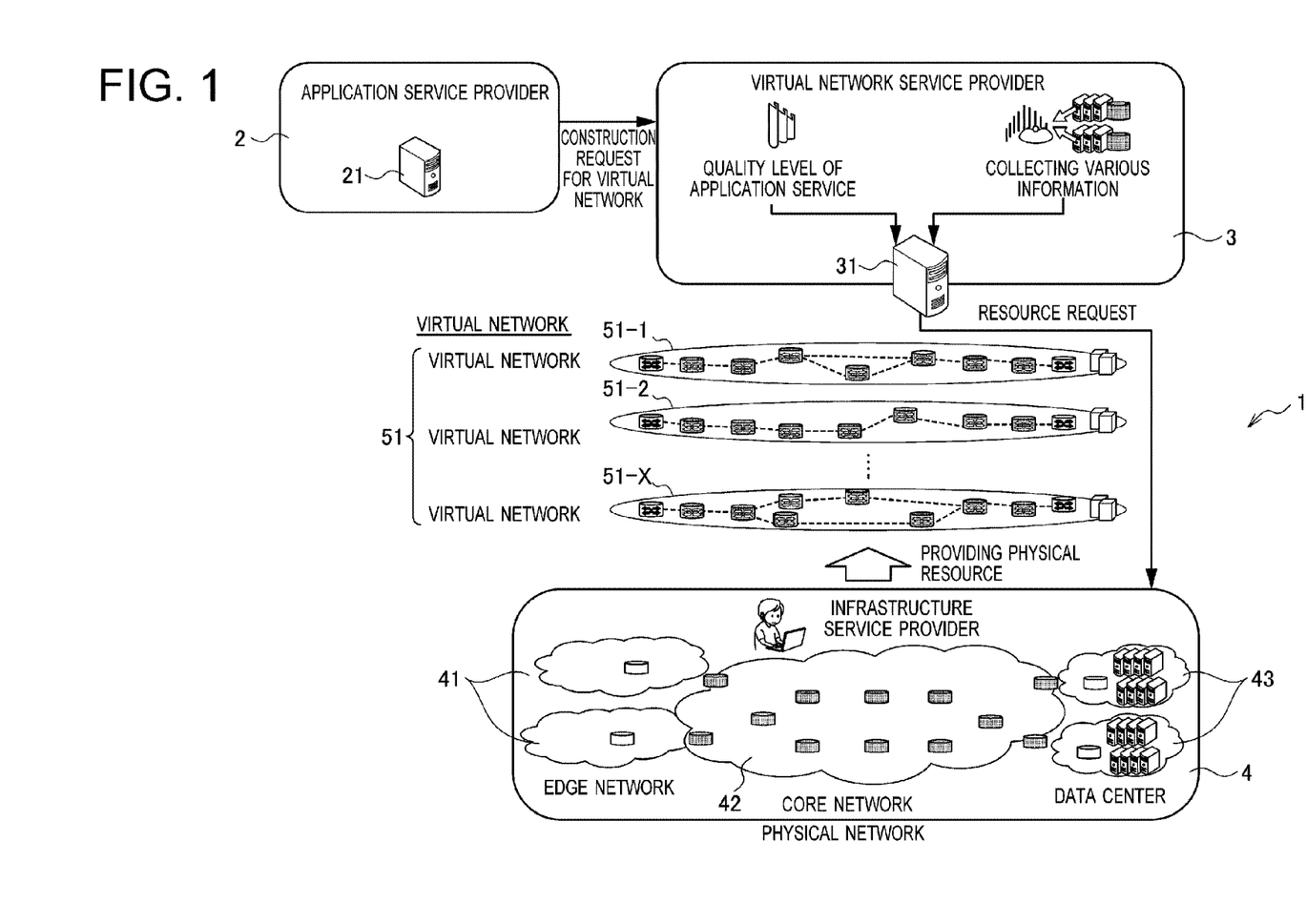
FIG. 1 illustrates a network structure of a virtual resource automatic selection system 1 to which the present invention is applied.

FIG. 1 illustrates a network structure of a virtual resource automatic selection system 1 to which the present invention is applied. The virtual resource automatic selection system 1 is operated by three main entities: an application service provider 2, a virtual network service provider 3, and an infrastructure service provider 4. The virtual resource automatic selection system 1 includes an electronic device 21, which is controlled under the application service provider 2, and a control device 31, which is controlled under the virtual network service provider 3.

The application service provider 2 is, for example, a business entity or the like that provides an application service, which may be executed in a communication terminal, such as a mobile phone, a smartphone, a tablet terminal, a wearable terminal, or a notebook personal computer (PC). The electronic device 21, which is controlled by the application service provider 2, is a personal computer (PC), a server, or the like and is a device that is operable at least on the basis of the intent of the application service provider 2. The electronic device 21 acquires, in advance, the level of quality of service required for an application service to be executed through the application service provider 2 or measures the required level of quality of service, and stores the information about the acquired or measured level of quality. The electronic device 21 transmits a virtual network construction request to the control device 31 when a virtual network needs to be constructed in order to execute the above-mentioned application service. In response to a request from the control device 31, the electronic device 21 notifies the control device 31 of the level of quality of service required for the application service. The electronic device 21 is connected to a public communication network (not illustrated) constituted by the Internet and the like to be connected to via a communication line and can communicate with any device connected to the public communication network.

When a virtual network needs to be constructed in order for the application service provider 2 to execute an application service, the virtual network service provider 3 plays a role of constructing a virtual network optimal for the application service. The control device 31, which is controlled by the virtual network service provider 3, acquires the level of quality of service required for the application service notified by the electronic device 21 and collects various pieces of information. The control device 31 may be connected to a public communication network (not illustrated) constituted by the Internet and the like and can collect the above-mentioned information via the public communication network.

The virtual network service provider 3 forms a logical topology on the basis of the acquired level of quality of service and the collected pieces of information and selects a virtual resource. Thereafter, the virtual network service provider 3 maps the virtual resource to a physical resource and requests the physical resource from the infrastructure service provider 4.

The infrastructure service provider 4 includes a large-scale network constituted by an edge network 41, a core network 42, a data center 43, and so on and plays a role of maintaining communication infrastructure by providing a resource to a virtual network 51 on the basis of an instruction from the virtual network service provider 3. The edge network 41 is constituted by a group of devices that collect and process information from a wide variety of IoT terminals. The core network 42 is connected to the edge network 41 and the data center 43 and constitutes a communication network composed of a plurality of core nodes. The data center 43 is constituted by a group of servers that store various pieces of data necessary for communication or the like.

The infrastructure service provider 4 carries out the above-described various processes via a terminal device (not illustrated) connected to the core network 42.

The virtual network 51 is constructed to extend across the edge network 41, the core network 42, and the data center 43 and includes, for example, network resources such as a link bandwidth and a node buffer space as well as, for example, a CPU (central processing unit), a memory, a storage capacity, and the like as computer resources such as a server. Virtual networks 51-1, 51-2, . . . , and 51-X have mutually different physical resources, network resources, computer resources, and virtual topologies allocated thereto by the infrastructure service provider 4 in accordance with a resource request from the virtual network service provider 3.

Figure 2:
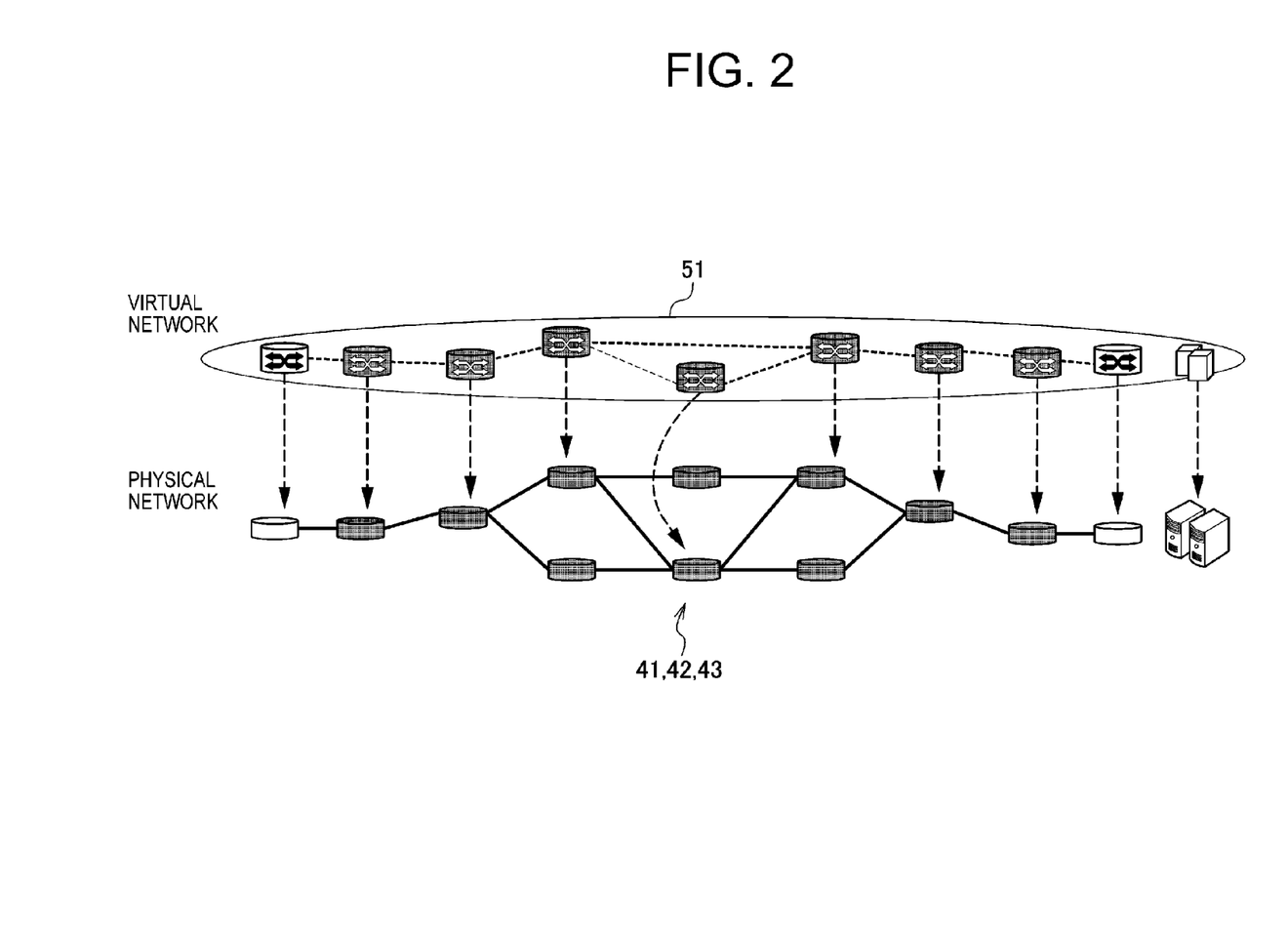
FIG. 2 illustrates an image in which virtual networks are mapped to core networks serving as physical resources.

FIG. 2 illustrates an image in which the virtual network 51 is mapped to the edge network 41, the core network 42, and the data center 43, which serve as the physical resources. The virtual network 51 has one or more of the existing physical resources allocated thereto and is thus constituted by a single, independent virtual communication network.

A method of selecting a resource for the virtual network 51 by the virtual resource automatic selection system 1 to which the present invention is applied will now be described.

According to the embodiment of the present invention, the virtual resource of each virtual network 51 is automatically selected through a classification technique of supervised learning, which is a type of machine learning. In other words, control that includes determining a policy for automatically selecting a virtual resource through supervised learning and adaptively modifying the policy is carried out.

Figure 3:
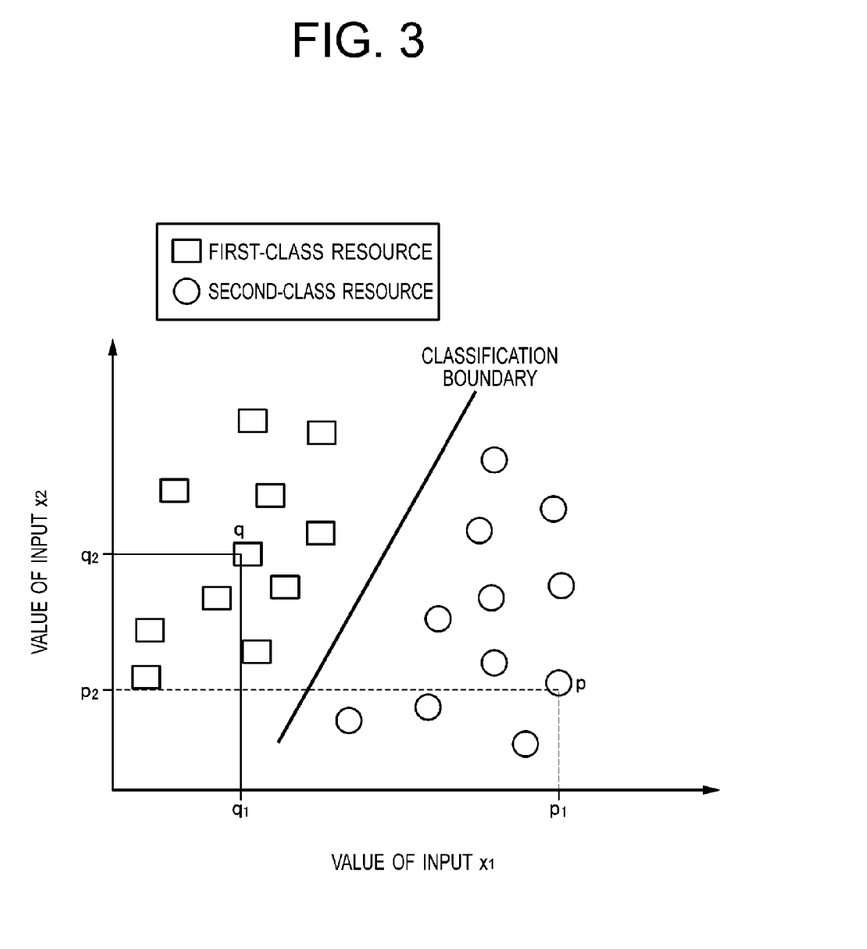
FIG. 3 illustrates an example in which training data for supervised learning are plotted.

FIG. 3 illustrates an example in which training data for supervised learning are plotted. The training data are identified by a combination of two parameters $x_1$ and $x_2$ and an actually allocated virtual resource. The training data are identified by the parameters $x_1$ and $x_2$ and the virtual resource held when the virtual resource was actually allocated to the virtual network 51 in the past. In the example illustrated in FIG. 3, a case in which two types of resources, namely, a first-class resource and a second-class resource serve as the allocated virtual resources is illustrated as an example. These resources may be expressed by a combination of a link bandwidth, a node buffer space, and CPU/memory/storage capacity or the like of a server. The first-class resource as used herein is a resource with a larger capacity among the resources to be allocated, and for example, is assumed to have "a link bandwidth of a speed of 10 Gbps (resource occupation) and a node buffer size of 1 GB at a core network and a server CPU of 10 GHz, a server memory of 1 GB, and a storage capacity of 10 GB at an edge network and a data center" or the like. The second-class resource as used herein is a resource with a smaller capacity among the resources to be allocated and, for example, is assumed to have "a link bandwidth of a speed of 1 Gbps (resource share) and a node buffer size of 10 MB at a core network and a server CPU of 100 MHz, a server memory of 10 MB, and a storage capacity of 100 MB at an edge network and a data center" or the like.

Examples of the parameters $x_1$ and $x_2$ include the requirement for the link bandwidth, the requirement for the packet loss ratio, the requirement for the delay and the delay variation, the geographical location where the data is received, the traffic load, and the device failure status.

How these parameters are turned into data and plotted will be described. The requirement for the link bandwidth is assumed to be in a range from approximately 1 Mbps to 100 Gbps, and the numerical value required by each application is plotted. For example, the numerical values such as 8 Mbps (transmission of a dynamic image), 1.5 Gbps (transmission of an uncompressed HD video image), 6.4 Gbps (transmission of an uncompressed 4K video image), 24 Gbps (transmission of an uncompressed 8K video image), and so on may be plotted. With regard to the packet loss ratio, the packet loss ratio is required to be no greater than $1\times10^{-3}$ in an application that conforms to the service quality classes 0-4 defined by ITU-T Y.1541 and is required to be no greater than $1\times10^{-5}$ in the classes 6 and 7. Thus, the numerical values of such packet loss ratios are plotted.

With regard to the requirement for the delay, for example, the delay is required to be no greater than 100 ms in an application that conforms to the service quality classes 0, 2, and 6 defined by ITU-T Y.1541, is required to be no greater than 400 ms in the classes 1, 3, and 7, and is required to be no greater than 1 sec in the class 4. Thus, such delay amounts may be plotted. With regard to the delay variation, the delay variation is required to be no greater than 50 ms in the classes 0, 1, 6, and 7, and such numerical values are plotted accordingly. With regard to the device failure status, the power or the like of a received optical signal at each node on the core network may be plotted as a parameter that correlates with the device failure.

For example, training data p indicates a case in which the value of the parameter $x_1$ is $p_1$, the value of the parameter $x_2$ is $p_2$, and the allocated virtual resource is a second-class resource. In addition, training data q indicates a case in which the value of the parameter $x_1$ is $q_1$, the value of the parameter $x_2$ is $q_2$, and the allocated virtual resource is a first-class resource. In this manner, by inputting the two parameters $x_1$ and $x_2$ and the allocated virtual resource for each piece of training data composed of past data, the scatter diagram of the two-dimensional coordinates as illustrated in FIG. 3 can be generated. In this manner, in addition to the parameters $x_1$ and $x_2$ of the training data, information on the capacity of the virtual resource allocated thereto is plotted on the scatter diagram of the two-dimensional coordinates.

Overlooking such a scatter diagram reveals that the second-class resource is more likely to be allocated when the value of $x_1$ is greater and the value of $x_2$ is smaller. In other words, a virtual resource cluster composed of second-class resources is formed at the lower right. Similarly, the scatter diagram reveals that the first-class resource is more likely to be allocated when the value of $x_1$ is smaller and the value of $x_2$ is greater. In other words, a virtual resource cluster composed of first-class resources is formed at the upper left.

A classification boundary for classifying into the virtual resource cluster composed of first-class resources and the virtual resource cluster composed of second-class resources in this manner can be set. A support vector machine (SVM), for example, may be used for this classification boundary. The SVM carries out classification by maximizing a margin between a cluster, which is a set of training data, and a classification boundary line.

The relationship between the parameters $x_1$ and $x_2$ of the training data and the classification boundary as illustrated in FIG. 3 is acquired in advance. Then, when it is determined which of the first-class resource and the second-class resource is to be allocated to a virtual network 51 to be newly constructed, the relationship between the parameters $x_1$ and $x_2$ of the training data and the classification boundary is referred to.

Figure 4:
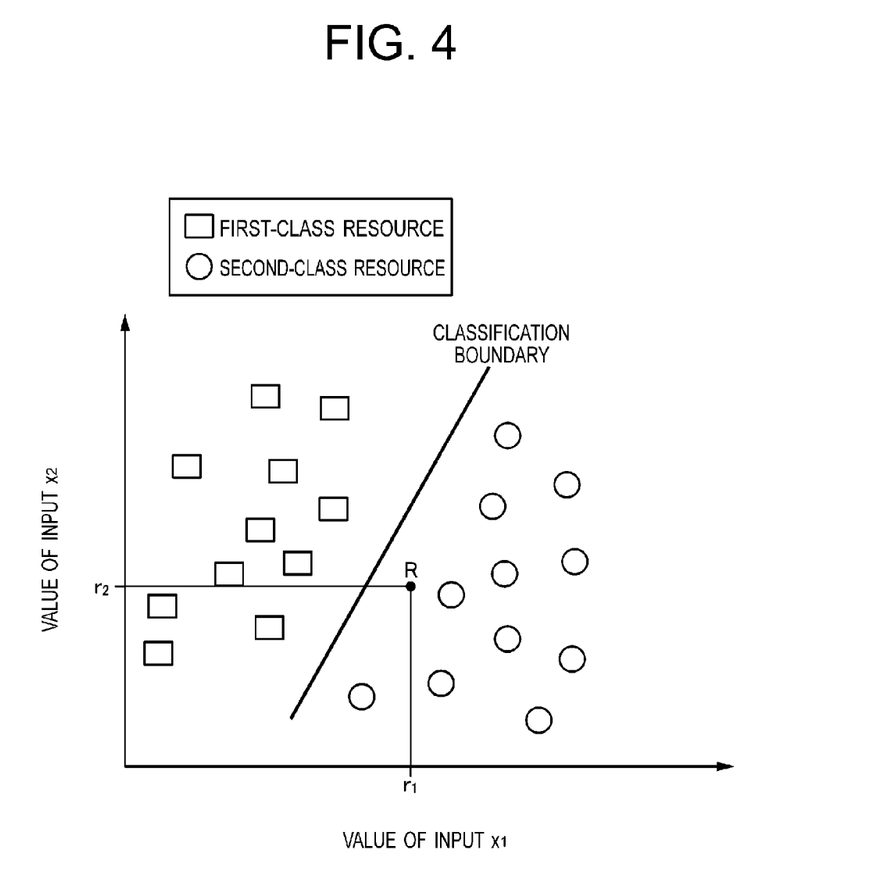
FIG. 4 illustrates an example in which an input vector composed of two or more parameters required for a virtual network to be constructed is received.

As illustrated in FIG. 4, input information composed of two or more parameters $x_1$ and $x_2$ required for a virtual network to be constructed is received. Hereinafter, this received input information is referred to as an input vector R. The parameters $x_1$ and $x_2$ are read from the input vector R. When a case in which the value of the parameter $x_1$ of the input vector R is $r_1$ and the value of the parameter $x_2$ of the input vector R is $r_2$ is plotted onto the coordinate axes and when the plot is located on the side of the virtual resource cluster composed of second-class resources across the classification boundary, a second-class resource is allocated to the virtual network to be constructed. On the other hand, when the values of the parameters $x_1$ and $x_2$ of the input vector R are located on the side of the virtual resource cluster composed of first-class resources across the classification boundary, a first-class resource is allocated to the virtual network to be constructed. The reason for such allocation is as follows. The result from the past training data supports that, when the values $(r_1, r_2)$ of the parameters $x_1$ and $x_2$ of the input vector R are located on the side of the virtual resource cluster composed of second-class resources across the classification boundary, the communication can be carried out without any problem even when a second-class resource is allocated in a similar manner. Similarly, the result from the past training data indicates that, when the values $(r_1, r_2)$ of the parameters $x_1$ and $x_2$ of the input vector R are located on the side of the virtual resource cluster composed of first-class resources across the classification boundary, a desired communication quality cannot be secured unless a first-class resource is allocated in a similar manner. In other words, according to the embodiment of the present invention, the past training data is referred to, and the capacity of the resource to be allocated is controlled.

Figure 5:
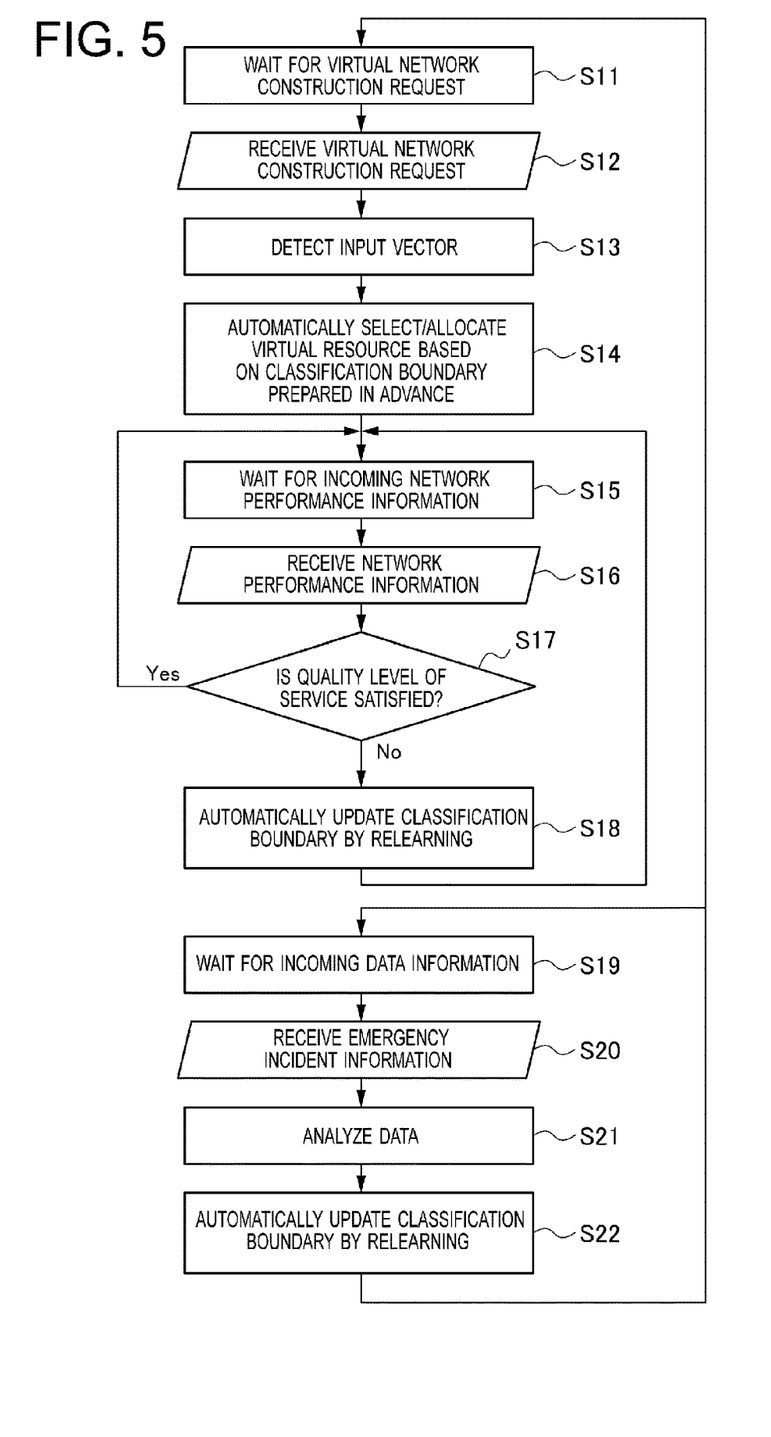
FIG. 5 illustrates a flowchart for allocating a resource to a virtual network to be newly constructed.

FIG. 5 illustrates a flowchart for allocating a resource to a virtual network 51 to be newly constructed. In step S11, the virtual network service provider 3 receives a virtual network construction request from the application service provider 2. This virtual network construction request is a construction request transmitted to the virtual network service provider 3 when a virtual network 51 needs to be newly constructed in order to execute an application service provided by the application service provider 2. It is to be noted that the relationship between the parameters $x_1$ and $x_2$ of the training data and the classification boundary as illustrated in FIG. 3 is acquired in advance prior to the start of step S11.

When the virtual network service provider 3 receives a virtual network construction request from the application service provider 2 in step S12, the processing proceeds to step S13, and an input vector R is detected. The input vector R is detected in step S13 in accordance with the parameters $x_1$ and $x_2$ composing the above-described training data. If the parameters $x_1$ and $x_2$ of the training data are, for example, the geographical location where the data is received and the traffic load, the geographical location and the traffic load of the virtual network 51 to be newly constructed are measured for the input vector as well, and the measured results serve as the values $(p_1, p_2)$ of the parameters $x_1$ and $x_2$ of the input vector R.

The processing then proceeds to step S14. In step S14, the values $(r_1, r_2)$ of the parameters $x_1$ and $x_2$ of the input vector R acquired in step S13 are read, and it is determined whether the values $(r_1, r_2)$ are located on the side of the virtual resource cluster composed of first-class resources or on the side of the virtual resource cluster composed of second-class resources across the classification boundary by referring to the relationship between the parameters $x_1$ and $x_2$ of the training data and the classification boundary. A first-class resource is allocated automatically if the values $(r_1, r_2)$ are located on the side of the virtual resource cluster composed of first-class resources, whereas a second-class resource is allocated automatically if the values $(r_1, r_2)$ are located on the side of the virtual resource cluster composed of second-class resources. The determination as to which resource is allocated in step S14 is made by the control device 31. Then, the control device 31 (the virtual network service provider 3) transmits a resource request for allocating either the first-class resource or the second-class resource as determined by the control device 31 to the infrastructure service provider 4.

In response to the resource request from the virtual network service provider 3, the infrastructure service provider 4 allocates a physical resource to the virtual network 51 to be constructed. The allocation is based on either the first-class resource or the second-class resource selected by the virtual network service provider 3. After the resource is allocated to the virtual network 51 by the infrastructure service provider 4, the processing proceeds to step S15. The virtual network 51 functions as a network upon having the resource allocated thereto by the infrastructure service provider 4, and the construction is completed.

In step S15, transmission of network performance information from the virtual network 51 that has been constructed in step S14 is waited for. The network performance information is information as to whether the virtual network 51 is implementing a desired operation normally on the basis of the resource allocated in step S14 and as to whether the level of quality of the application service executed in the virtual network 51 is being satisfied. When the network performance information can be received in step S16, the processing proceeds to step S17, and the network performance information is analyzed. If the level of quality of the application service executed in the virtual network 51 satisfies the desired level of quality of service and the desired operation is being implemented normally according to the network performance information, it is understood that the resource allocated in step S14 is appropriate. In such a case, the processing returns to step S15 without any special, new control being added, and the processing to follow is continued. The reception of the network performance information in step S16 and the determination in step S17 may be carried out by any of the application service provider 2, the virtual network service provider 3, and the infrastructure service provider 4.

If the result of analyzing the network performance information in step S17 indicates that the level of quality of the application service executed in the virtual network 51 does not satisfy the desired level of quality of service and the desired operation is not being implemented normally according to the network performance information, it is understood that the resource allocated in step S14 is inappropriate. In such a case, the processing proceeds to step S18.

Figure 6A:
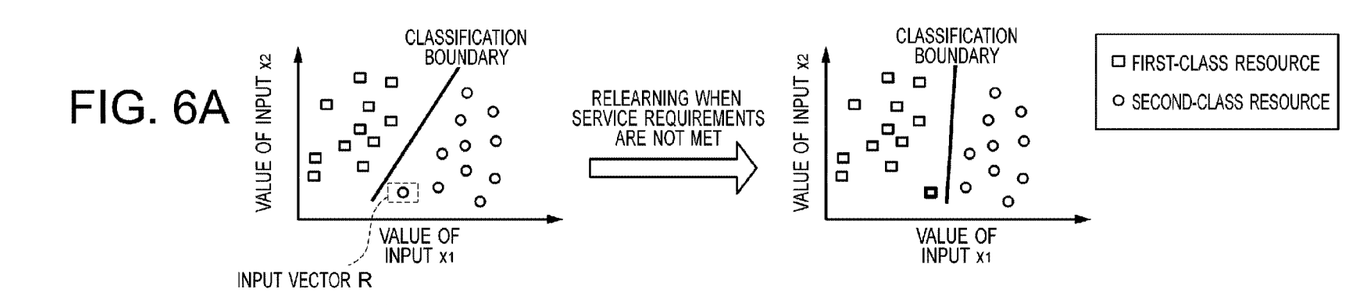
FIG. 6A to FIG. 6C illustrate examples in which a classification boundary is updated automatically by relearning.

In step S18, the classification boundary is automatically updated by relearning. For example, as illustrated in FIG. 6A, if it is determined in step S17 that the level of quality of service does not satisfy the desired level of quality of service as a result of determining that the input vector R is located on the side of the virtual resource cluster composed of second-class resources and allocating a second-class resource to the virtual network 51, it is understood that a first-class resource needs to be allocated to the virtual network 51. A specific example of such a case can be a case in which it is determined that the resource does not satisfy the service requirement of the virtual network 51 due to a traffic change, a device failure, or the like. In such a case, the plot corresponding to this input vector R is switched from the second-class resource to the first-class resource, and the classification boundary is updated automatically. In other words, the classification boundary is updated such that the plot corresponding to this input vector R is classified into the cluster of first-class resources.

In step S18, in addition to the relearning and the automatic update of the classification boundary, the resource may be reallocated to the virtual network 51 constructed in step S14. In such a case, since the plot corresponding to the input vector R is located on the side of the virtual resource cluster composed of first-class resources across the updated classification boundary, a first-class resource is allocated to the virtual network 51. As a result, a first-class resource with a larger capacity than the previously allocated second-class resource is allocated to the virtual network 51, and thus it becomes more likely that the level of quality of the executed application service satisfies the desired level of quality of service and the desired operation can be implemented normally.

A similar process applies in a case in which the level of quality of the service fairly exceeds the required performance in step S17 as a result of determining that the input vector R is located on the side of the virtual resource cluster composed of first-class resources and allocating a first-class resource to the virtual network 51 in step S14. In such a case, it is likely that the desired level of quality of service can be achieved even if a second-class resource is allocated, and thus the classification boundary is updated such that the position of the plot of the input vector R is included in the cluster of second-class resources.

In other words, according to the embodiment of the present invention, the policy for selecting a virtual resource can be modified adaptively in accordance with the result of monitoring the quality performance of the virtual network 51. As a result, an occurrence of a mismatch of a resource provided to a virtual network 51 to be newly constructed can be prevented. In particular, the classification boundary for the parameters $x_1$ and $x_2$ is made more appropriate by repeating such learning, and the accuracy of the policy for selecting a virtual resource can be improved. In addition, the resource is reallocated automatically to a virtual network 51 that has ceased to satisfy the required quality of service. Thus, even if a user does not carry out any special operation, an appropriate resource is allocated naturally, and a desired application is executed.

In the embodiment of the present invention, the processes in steps S19 to S22 may be executed when an emergency incident has occurred.

In step S19, reception of data information is waited for, and specifically, reception of information pertaining to an emergency incident is waited for. The emergency incident as used herein means an incident that requires more preferential allocation of communication resources, such as natural disasters including an earthquake, a typhoon, a flood, and a tsunami, various emergency situations based on political or social causes, and any other incidents threatening human lives. The information pertaining to such emergency incidents may be collected periodically from related information providing websites, Twitter (registered trademark), and the like.

If information pertaining to an emergency incident is received (step S20), the processing proceeds to step S21, and the received information is analyzed. If the received information is not on an emergency incident, any special modification may be made to the processing operation. In contrast, if it is determined that the received information is on an emergency incident, the processing proceeds to step S22, the classification boundary is updated automatically, and the resource is reallocated.

Figure 6B:
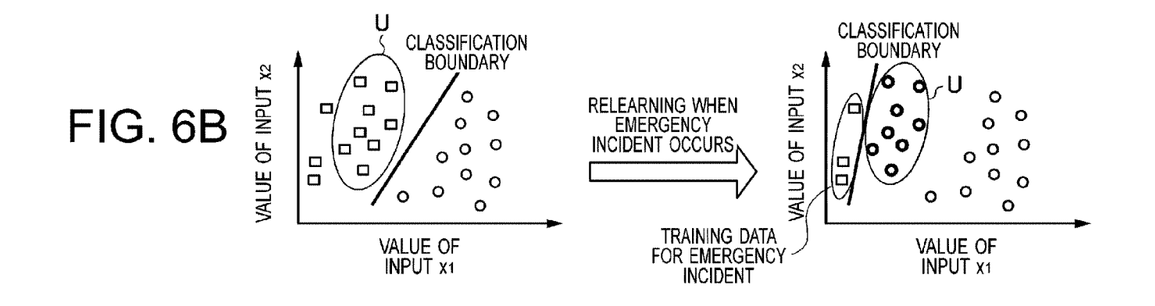

In the reallocation of the resource in relation to the emergency incident, the classification boundary is shifted as illustrated in FIG. 6B so that a first-class resource is allocated preferentially to a virtual network 51 related to the emergency incident. In this case, training data for emergency incidents and training data for other cases are acquired in advance, and a first-class resource is allocated only to the training data for emergency incidents. A second-class resource is allocated to the training data for cases other than emergency incidents. The classification boundary between the first-class resources and the second-class resources to be allocated in an emergency incident and a non-emergency incident, respectively, is set in advance.

There is also a possible case in which not all the first-class resources are used up in an emergency incident, and in such a case, it is effective to leave some room for allocating a first-class resource to communication in need of such in a non-emergency incident. In such a case, the classification boundary illustrated on the right side of FIG. 6B may be shifted slightly to the right.

With regard to the training data for emergency incidents, the parameters $x_1$ and $x_2$ of the training data for such emergency incidents are identified by subjecting the information collected when an emergency incident has actually occurred to the data analysis in step S21, and the level of quality of a resource required when a virtual network 51 is constructed in such an emergency incident is predicted. Thus, the plot of training data as illustrated in FIG. 6B can be obtained.

If the information pertaining to an emergency incident is not received in step S19, the processing returns to step S14 via steps S11, S12, and S13, and the resource is allocated on the basis of the classification boundary illustrated on the left side of FIG. 6B. If the information pertaining to an emergency incident is received in step S19, the processing proceeds to steps S20 and S21. Then, in step S22, the classification boundary illustrated on the right side of FIG. 6B is shifted, and upon the processes in steps S11, S12, and S13, in step S14, the resource is allocated on the basis of the classification boundary illustrated on the right side of FIG. 6B. In the case of an emergency incident, a first-class resource is allocated since the values $(r_1, r_2)$ of the parameters $x_1$ and $x_2$ of the input vector R belong to the same cluster as the training data for emergency incidents across the classification boundary. Here, the region of the second-class resources across the classification boundary is large, and it becomes more likely that a second-class resource is allocated in cases other than emergency incidents, which increases the possibility that a first-class resource is allocated to an emergency incident. In an emergency incident in particular, the required level of quality of service is higher than usual, and a necessary amount of resources is more likely to be allocated. As a result, the shortage of resources (blocking of resource request) in the virtual network 51 in an emergency incident can be alleviated, and a resource suitable for a given situation can be secured.

The processing passes through step S22 when returning to step S14. Thus, the classification boundary may be updated by relearning in step S22, as in step S18. In addition to returning to step S14 from step S22, the processing also returns to step S19 and enters a stand-by state by for an emergency incident again.

In particular, with regard to a cluster U in FIG. 6B, a first-class resource may be allocated thereto or a second-class resource may be allocated thereto as the classification boundary shifts between a normal time and an emergency time. When an input vector is located in such a cluster U, and another input vector with higher urgency is present, then a first-class resource is allocated to the latter, and thus the classification boundary is shifted as illustrated on the right side of FIG. 6B. However, when no other input vector with higher urgency is present, it is desirable to improve the performance of a virtual network 51 by possibly allocating a first-class resource to the cluster U as well. Thus, when a virtual network associated with an emergency incident becomes unnecessary, the classification boundary illustrated on the right side of FIG. 6B may be shifted to the classification boundary illustrated on the left side of FIG. 6B, the resource may be released, and the classification boundary may be returned automatically.

Although the example of shifting the classification boundary in an emergency incident has been described above, the example is not limited thereto, and this shifting may be carried out in response to any other event aside from an emergency incident. This event, for example, is traffic congestion caused by an accident in logistics, security increase in a specific area, a disaster, a sudden holding of an entertainment event, or the like.

An occurrence of an event is detected in step S20, and a classification boundary of a virtual resource cluster for event occurrence corresponding to the required level of quality of application in a case in which an event has occurred is set in advance. Then, when an occurrence of an event is detected, the classification boundary is shifted to the classification boundary for event occurrence, and this can increase the possibility that the capacity of the virtual resource in the case in which an event has occurred (e.g., first-class resource) is allocated.

The part of the flowchart after step S19 is for the case in which an emergency incident is detected, and these steps may be executed independently from and concurrently with the operation in the flowchart for a non-emergency incident preceding step S18.

Figure 6C:
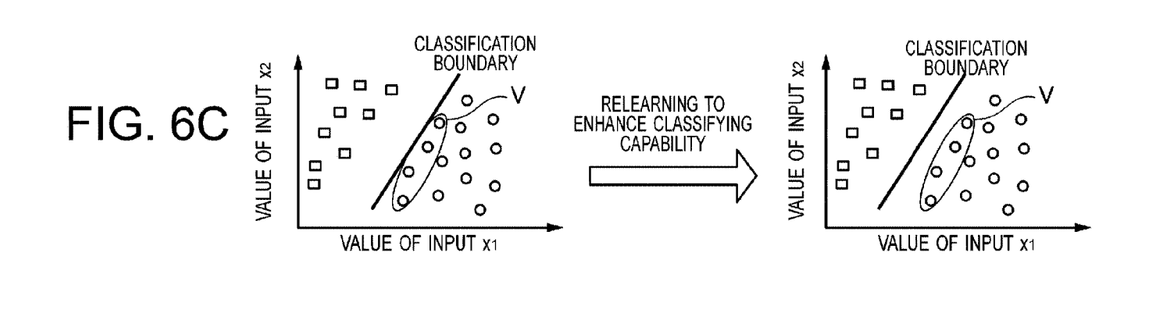

In the example illustrated in FIG. 6C, the resource is not reallocated, but a cluster V constituting training data for second-class resources close to the classification boundary is provided, and the classification boundary is thus modified. As the training data in the cluster V is provided, the original classification boundary illustrated on the left side of FIG. 6C results in an unbalance between the distances from the respective clusters to the classification boundary. Thus, the classification boundary is shifted automatically to an optimal position so that the margins between the respective clusters and the classification boundary are maximized. In other words, at a point at which a certain amount of additional training data has accumulated, the distribution state of the training data may be overlooked, and the classification boundary may be reset automatically to an optimal position. This reduces the possibility that a virtual resource in another cluster is allocated to an input vector for a new virtual network construction request that is somewhat offset from the training data in the cluster V. Thus, the resources can be used efficiently, and a virtual resource can be selected automatically in accordance with a given situation.

Although an exemplary case in which the classification boundary is set with the use of a linear SVM has been described in the embodiment of the present invention, the example is not limited thereto. For example, the classification boundary is not limited to be linear and may be constituted by a nonlinear line.

Although an exemplary case in which an input vector is constituted by a two-dimensional coordinate system of the parameters $x_1$ and $x_2$ has been described above, the number of the dimensions of the input vector, i.e., the number of the parameters constituting the input vector may be three or more. Similarly, three or more ranks may be set for the resources by setting the number of the classification boundaries to two or more, and three or more cluster regions may be formed. In this case, multi-class classification may be carried out by applying an existing technique such as One-versus-Rest approach or All-Pair approach. In other words, any number of ranks may be set as long as virtual resource clusters divided in advance into a plurality of ranks in accordance with the capacity of the virtual resources are defined in advance. In such a case, the number of choices for the virtual resources can be increased through multi-class classification by applying an existing technique.

Although the premise is that the value of each constituent element of an output is already determined when a virtual resource is selected for each virtual network, the increase or decrease of the physical resource(s) can be fine-tuned as necessary in consideration of the use environment, such as a traffic load, of a large-scale network constituted by edge/core/cloud after a physical resource is actually allocated.

In the embodiment described above, the premise is that the supervised learning represented by the SVM has obtained a number of pieces of training data. If a sufficient number of pieces of training data have not been obtained, training data may be manually registered (introduced), or another mechanical learning technique such as semi-supervised learning or reinforcement learning may be used.

The present invention configured as described above is particularly effective in an environment in which, for example, the network use environment (traffic load, occurrence of failure or emergency incident) changes with time. Examples of such an environment include an environment in which traffic congestion caused by an accident in logistics, security increase in a specific area, a disaster, a sudden holding of an entertainment event, or the like can occur or a rapidly-increasing environment in which an IoT-related application service in which a movable device such as a mobile terminal or a sensor terminal is used is provided.

Example 1

Figure 7:
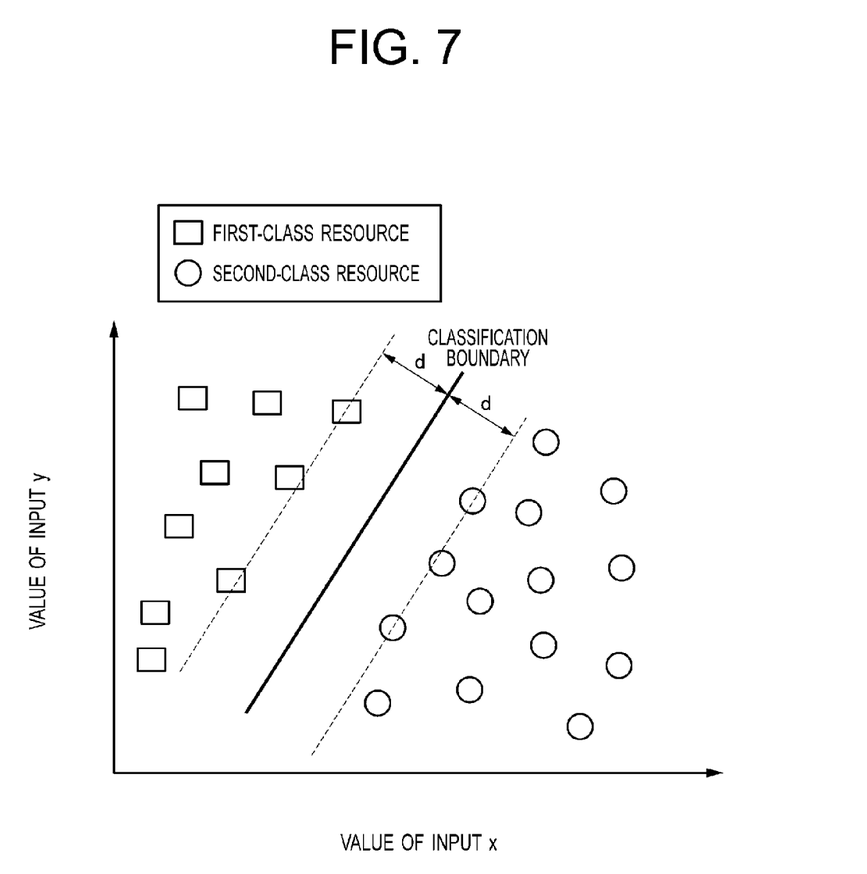
FIG. 7 illustrates a classification boundary and a model of parameters of training data described in an example.

Hereinafter, an example in which a classification boundary is set with the use of SVM will be described. FIG. 7 illustrates the classification boundary and a model of parameters of training data described in this example. The training data are composed of $x_1$, $y_1$, and $t_1$ when an input vector is two-dimensional, for example. Here, $x_1$ and $y_1$ represent an input vector, and $t_1$ is the value of an output of the training data and is 1 or −1. The distances from the classification boundary to the cluster of first-class resources and to the cluster of second-class resources are each represented by d. When the number of pieces of training data is n, i=1, 2, ..., n (natural number) holds. In this case, it is the feature of the SVM to maximize the distance d from the classification boundary to the training data that is closest to the classification boundary.

The formula for deriving the classification boundary when the input vector is two-dimensional is shown below.

$$\text{distance } d = \frac{|\omega_1 x_i - \omega_2 y_i - C|}{\sqrt{\omega_1^2 - \omega_2^2}} = \frac{1}{\sqrt{\omega_1^2 - \omega_2^2}}$$

In this formula, C is a scalar variable and is also referred to as a bias. The constraint condition is expressed as follows.

constraint condition: $t_i \times (\omega_1 x_i + \omega_2 y_i + C) \leq 1$

Under such a constraint condition, $\omega_1$, $\omega_2$, and C that minimize the denominator of the distance d are obtained. As a result, the classification boundary is expressed by the following formula.

$f(x) = \omega_1 x_i + \omega_2 y_i + C = 0$

A method of deriving a classification boundary in a case in which an input vector is three-dimensional will now be described. The training data are constituted by the three values: $x_i$, $y_i$, and $z_i$. The formula for deriving the classification boundary when the input vector is three-dimensional is shown below.

$$\text{distance } d = \frac{|\omega_1 x_i - \omega_2 y_i - \omega_3 z_i - C|}{\sqrt{\omega_1^2 - \omega_2^2 - \omega_3^2}} = \frac{1}{\sqrt{\omega_1^2 - \omega_2^2 - \omega_3^2}}$$

The constraint condition is expressed as follows.

constraint condition: $t_i \times (\omega_1 x_i + \omega_2 y_i + \omega_3 z_i + C) \leq 1$ Under such a constraint condition, $\omega_1$, $\omega_2$, $\omega_3$, and C that minimize the denominator of the distance d are obtained. As a result, the classification boundary is expressed by the following formula.

$f(x) = \omega_1 x_i + \omega_2 y_i + \omega_3 z_i + C = 0$

This application is based on Japanese Patent Application No. 2016-94780 filed on May 10, 2016, and the entire disclosure thereof is incorporated herein by reference.

What is claimed is:

1. A virtual resource automatic selection system that automatically selects a virtual resource to be allocated when a virtual network is constructed, the virtual resource automatic selection system comprising:
a computer which executes instructions stored in a memory to provide:
a classification boundary setting unit configured to set, for a plurality of pieces of training data composed of two or more parameters, a classification boundary between a plurality of virtual resource clusters that are ranked in advance in accordance with a capacity of a virtual resource in terms of a relationship between the two or more parameters;
an input information receiving unit configured to, when a construction request for a new virtual network is received, receive input information composed of the two or more parameters required for the virtual network to be constructed;
a cluster determining unit configured to determine to which of the virtual resource clusters the two or more parameters composing the input information received by the input information receiving unit belong by referring to the classification boundary set by the classification boundary setting unit;
an allocating unit configured to allocate a capacity of a virtual resource corresponding to the virtual resource cluster determined by the cluster determining unit to the virtual network for which the construction request has been received;
a performance information acquiring unit configured to acquire network performance information from the virtual network constructed based on the virtual resource allocated by the allocating unit; and
a service quality determining unit configured to determine whether the network performance information acquired by the performance information acquiring unit satisfies a desired quality of service,
the classification boundary setting unit being configured to update the classification boundary in accordance with a determination result of the service quality determining unit.

2. The virtual resource automatic selection system according to claim 1, wherein the classification boundary setting unit acquires in advance two-dimensional coordinates onto which a plurality of pieces of training data composed of two parameters are plotted with the two parameters representing respective coordinate axes, and sets the classification boundary onto the two-dimensional coordinates based on a capacity of a virtual resource to which each piece of the training data is assigned.

3. The virtual resource automatic selection system according to claim 1, further comprising an event occurrence detecting unit configured to detect an occurrence of an event, wherein the classification boundary setting unit sets in advance a classification boundary of a virtual resource cluster for event occurrence corresponding to a level of quality of an application required in a case in which the event occurs, and the cluster determining unit makes a determination upon shifting to the classification boundary of the virtual resource cluster for event occurrence in a case in which the event occurrence detecting unit detects an occurrence of the event.

4. The virtual resource automatic selection system according to claim 1, wherein the classification boundary setting unit generates new training data based on the two or more parameters composing the input information received by the input information receiving unit and the capacity of the virtual resource allocated by the allocating unit, and updates the classification boundary based on the newly generated training data and the determination result of the service quality determining unit.

5. The virtual resource automatic selection system according to claim 1, wherein, when the service quality determining unit determines that the acquired network performance information does not satisfy the desired quality of service, the allocating unit allocates a capacity of a virtual resource corresponding to the virtual resource cluster determined by the cluster determining unit to the virtual network for which the construction request has been received, upon the classification boundary setting unit having updated the classification boundary.

6. A virtual resource automatic selection method of automatically selecting a virtual resource to be allocated when a virtual network is constructed, the virtual resource automatic selection method comprising:
a classification boundary setting step of setting, for a plurality of pieces of training data composed of two or more parameters, a classification boundary between a plurality of virtual resource clusters that are ranked in advance in accordance with a capacity of a virtual resource in terms of a relationship between the two or more parameters;
an input information receiving step of, when a construction request for a new virtual network is received, receiving an input information composed of the two or more parameters required for the virtual network to be constructed;
a cluster determining step of determining to which of the virtual resource clusters the two or more parameters composing the input information received in the input information receiving step belong by referring to the classification boundary set in the classification boundary setting step;
an allocating step of allocating a capacity of a virtual resource corresponding to the virtual resource cluster determined in the cluster determining step to the virtual network for which the construction request has been received;
a performance information acquiring step of acquiring network performance information from the virtual network constructed on the basis of the virtual resource allocated in the allocating step; and
a service quality determining step of determining whether the network performance information acquired in the performance information acquiring step satisfies a desired quality of service,
the classification boundary being updated in the classification boundary setting step in accordance with a determination result in the service quality determining step.

* * * * *